(12) United States Patent
Cernasov et al.

(10) Patent No.: US 7,750,960 B2
(45) Date of Patent: Jul. 6, 2010

(54) SYSTEM AND APPARATUS FOR HIGH DYNAMIC RANGE SENSOR

(75) Inventors: Andrei Cernasov, Ringwood, NJ (US); Fernando R. De La Vega, Ridgefield Park, NJ (US); Donald J. Porawski, Cedar Grove, NJ (US)

(73) Assignee: Honeywell International Inc., Morristown, NJ (US)

( * ) Notice: Subject to any disclaimer, the term of this patent is extended or adjusted under 35 U.S.C. 154(b) by 1148 days.

(21) Appl. No.: 11/375,115

(22) Filed: Mar. 15, 2006

(65) Prior Publication Data

US 2007/0216789 A1 Sep. 20, 2007

(51) Int. Cl.
*H04N 3/15* (2006.01)
*H04N 5/335* (2006.01)

(52) U.S. Cl. ..................... 348/302; 348/308
(58) Field of Classification Search ............. 348/308, 348/302; 250/208.1; 257/291, 292, 293, 257/294
See application file for complete search history.

(56) References Cited

U.S. PATENT DOCUMENTS

| 5,461,425 | A | 10/1995 | Fowler et al. | |
|---|---|---|---|---|
| 6,157,016 | A | 12/2000 | Clark et al. | |
| 6,175,383 | B1 | 1/2001 | Yadid-Pecht et al. | |
| 6,441,852 | B1 | 8/2002 | Levine et al. | |
| 6,445,413 | B1 * | 9/2002 | Hosier et al. | 348/302 |
| 6,532,040 | B1 * | 3/2003 | Kozlowski et al. | 348/308 |
| 6,587,145 | B1 | 7/2003 | Hou | |
| 6,888,571 | B1 * | 5/2005 | Koshizuka et al. | 348/302 |
| 6,911,640 | B1 * | 6/2005 | Bencuya et al. | 250/208.1 |
| 6,972,995 | B1 * | 12/2005 | Hopper et al. | 365/185.19 |
| 7,274,397 | B2 * | 9/2007 | Fowler | 348/308 |
| 2002/0182788 | A1 * | 12/2002 | Pain et al. | 438/152 |
| 2003/0038887 | A1 * | 2/2003 | McCaffrey et al. | 348/308 |
| 2005/0036048 | A1 * | 2/2005 | Fowler | 348/302 |
| 2005/0057675 | A1 * | 3/2005 | Lee et al. | 348/308 |

* cited by examiner

*Primary Examiner*—Jason Whipkey
(74) *Attorney, Agent, or Firm*—Ingrassia Fisher & Lorenz, P.C.

(57) ABSTRACT

A system and method of operating a sensor array are provided. The method includes adjusting the reverse bias voltage for the photodiode of at least one pixel in the sensor array based on previous output values of one or more pixels in the array, algorithms, and/or user inputs.

19 Claims, 6 Drawing Sheets

SYSTEM AND APPARATUS FOR HIGH DYNAMIC RANGE SENSOR

FIELD

This invention relates generally to imaging systems. More particularly, embodiments relate to a high dynamic range sensor system.

DESCRIPTION OF THE RELATED ART

Digital cameras have become common and are used by a variety of people of varying skills and training. The sensor component that is used in a typical digital camera is a complementary metal oxide semiconductor (CMOS) camera integrated circuit (IC). A component of the CMOS camera IC is a CMOS pixel cell, as depicted in FIG. 1.

As shown in FIG. 1, the CMOS pixel cell 100 may include D photodiode 105, an M1 transistor 110, an equivalent C capacitor 115, an M2 transistor 125, and an M3 transistor 130. Amplifier 140 may be configured to be common to a plurality of pixel cells. The gate of M1 transistor 110 may be tied to a row reset signal and the source of the M1 transistor 110 may be connected to a $V_{reset}$ signal. The drain of the M1 transistor 110 may be connected to the cathode of the photodiode 105 and the anode of the photodiode 105 connected to ground, i.e., reversed-biased. The equivalent C capacitor 115 may include the capacitance of the photodiode 105 and may also include parasitic capacitances. The voltage at the junction of the drain of the M1 transistor 110, the cathode of the photodiode 105 and one terminal of the capacitor 115 may be designated as $V_D$ 120, which is also connected to the gate of M2 transistor 125.

The source of the M2 transistor 125 may be connected to $V_{DD}$ and the drain of the M2 transistor 125 may be connected to the source of the M3 transistor 130. The gate of the M3 transistor 130 may be connected to a row select signal and the drain of the M3 transistor 130 may be connected to a common pixel video out line 135. The output of the pixel video out line 135 may then be input to the amplifier 140.

The detection cycle of pixel cell 100 may be initiated by bringing the voltage across photodiode D 105 and the associated capacitor C 115 to a known level, mainly $V_{reset}$. This may be accomplished by turning ON transistor M1 110 so that it provides a path for the capacitor C 115 to charge.

Subsequently, light impinging on the junction of the photodiode D 105 generates charge carriers within its depletion region during an integration period. These carriers will act to discharge the capacitor C 115 at a rate proportional with the local intensity of the light. After the predetermined integration time has passed, transistor M3 130 samples the output of the voltage buffer transistor M2 125 when the row select signal is high. This voltage is substantially equal to the voltage at the gate of transistor M2 125 which is the voltage remaining across the photodiode D 105 after the charge decay induced by the illumination of the photodiode D 105.

FIG. 2 illustrates a conventional sensor array 200. As shown in FIG. 2, the pixel cells 205 may be arranged in an X-Y array at the chip level. The cells along each row sharing the same RESET and SELECT lines 210, 215, respectively, and all the cells along the same column sharing the same PIXEL OUT line 220. Row Reset and Row Select address decoders 225, 230, respectively, select which row is to be reset and which row is to be read, in accordance to a timing algorithm implemented by the timing engine 235. The differential time period between resets and reads is the integration time. Once a row is read, it is stored in a buffer 240 from where it is read out in a sequential or random order to an analog processor 250 (e.g., analog-to-digital converter, video encoder, or other similar device) through the multiplexer 245.

Since for most CMOS designs all the detection parameters are global ($V_{RESET}$, integration time, etc.), the dynamic range of the sensor output will be limited by the integrated circuit technology being employed (e.g., bandwidth, ADC resolution, etc.) and not reflect to a high degree of accuracy the images projected onto the IC by the optical front end. For example, in FIG. 3, during integration time (B), the pixel becomes saturated and induces an over-exposure condition. By contrast, the during integration time (C) the pixel remains practically at $V_{RESET}$ and induces an under-exposure condition.

SUMMARY

An embodiment generally relates to a method of operating a pixel sensor array. The method includes determining a reverse bias voltage of a pixel cell photodiode based on at least one previous output value of at least one pixel cell in the array.

Another embodiment generally pertains to an apparatus for operating a high-dynamic range sensor array. The apparatus includes a sample-and-hold circuit configured to be addressable and a pixel cell configured to receive light and output a voltage based on the received light. The sample-and-hold (S/H) circuit is configured to reverse bias a photodiode in the pixel cell based on a previously determined and stored output value of at least one pixel in the array.

Yet another embodiment generally relates to a system for operating a high-dynamic range sensor array. The system includes a plurality of addressable pixel cells. Each addressable pixel cell comprises an addressable S/H circuit and a pixel cell. The pixel cell reset voltage is determined by an output voltage of the S/H circuit. The system also includes a video out line connected to pixel out lines from the plurality of addressable pixel cells and an analog-to-digital (ADC) processor configured to receive the video out line. The ADC processor converts signals on the video out line to digital signals. The system also includes a processor configured to interface with the ADC processor. The processor is configured to determine reset voltage values for the plurality of addressable pixel cells in the sensor array. The system also includes a memory configured to store the reset voltage values for the addressable pixel cells in the sensor array and a digital-to-analog (DAC) processor configured to interface with the memory and the reset voltage line. The DAC processor is further configured to convert digital reset voltage values for the plurality of addressable pixel cells in the sensor array to analog reset voltage values and output the analog reset voltage values on the reset voltage line.

BRIEF DESCRIPTION OF THE DRAWINGS

Various features of the embodiments can be more fully appreciated, as the same become better understood with reference to the following detailed description of the embodiments when considered in connection with the accompanying figures, in which.

DETAILED DESCRIPTION OF EMBODIMENTS

Figure 1:
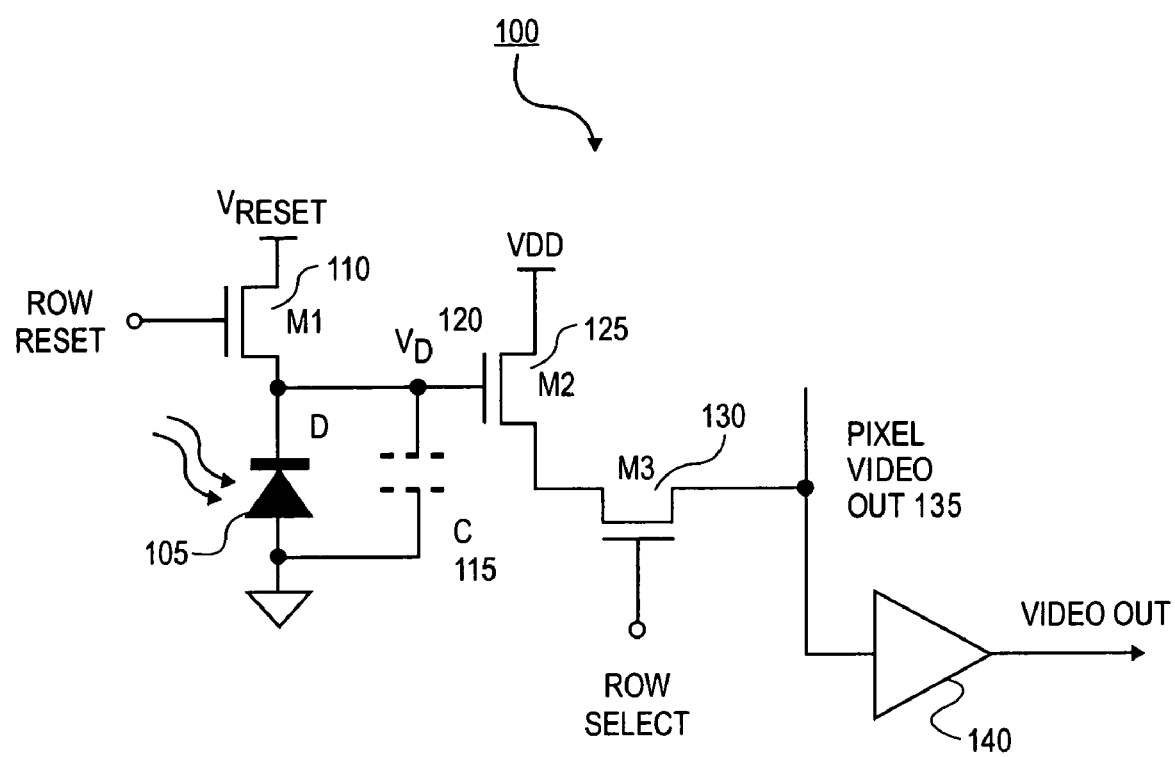
FIG. 1 illustrates a conventional pixel cell.
Figure 2:
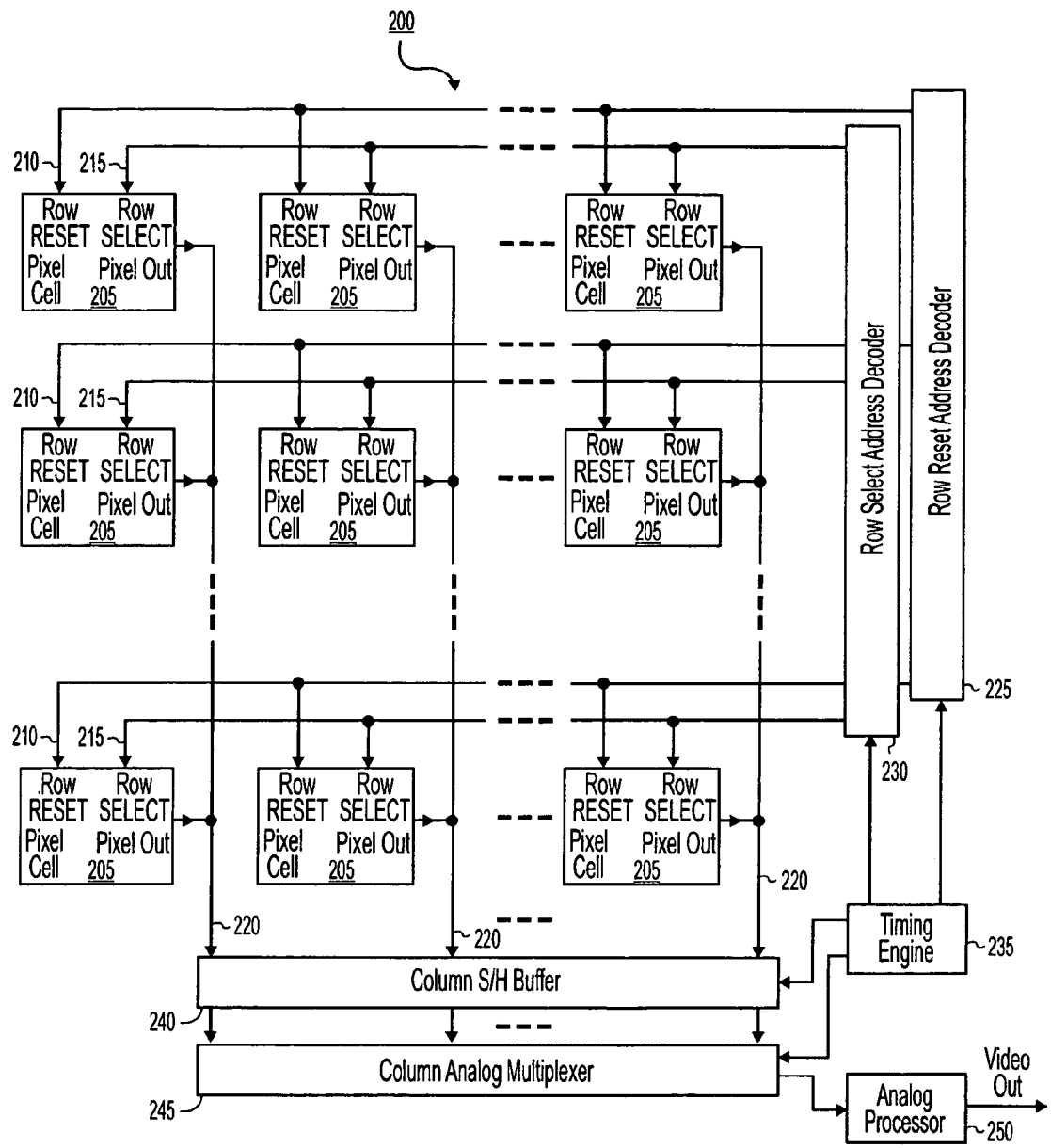
FIG. 2 illustrates a conventional camera system.
Figure 3:
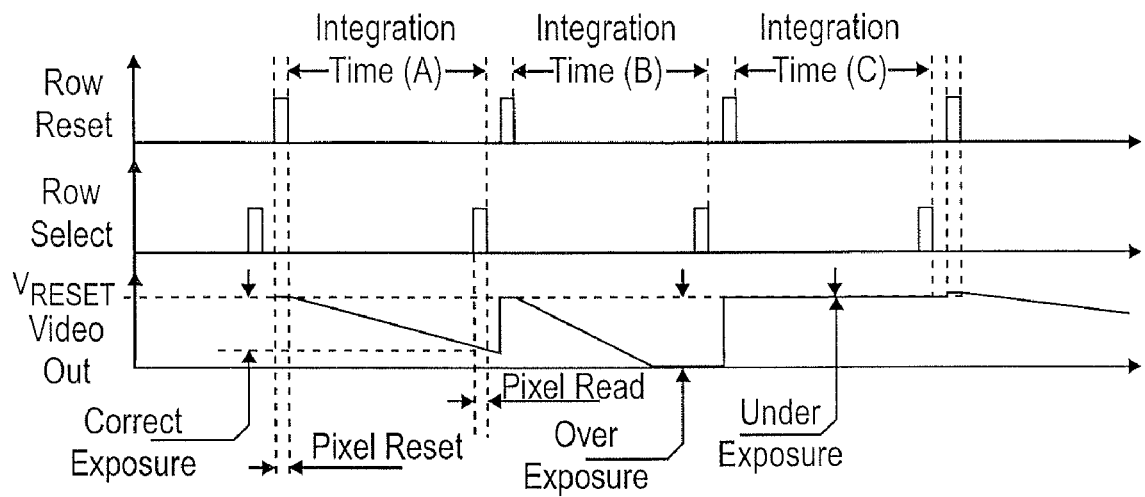
FIG. 3 illustrates an integration diagram for the conventional camera system.

For simplicity and illustrative purposes, the principles of the present invention are described by referring mainly to exemplary embodiments thereof. However, one of ordinary skill in the art would readily recognize that the same principles are equally applicable to, and can be implemented in, all types of imaging systems, and that any such variations do not depart from the true spirit and scope of the present invention. Moreover, in the following detailed description, references are made to the accompanying figures, which illustrate specific embodiments. Electrical, mechanical, logical and structural changes may be made to the embodiments without departing from the spirit and scope of the present invention. The following detailed description is, therefore, not to be taken in a limiting sense and the scope of the present invention is defined by the appended claims and their equivalents.

Embodiments generally relate to a high-dynamic range sensor array. More particularly, a high-dynamic range pixel cell may be configured to modify the bias voltage of a photodiode in the pixel cell based on a previous output voltage of the pixel cell and/or neighboring pixel cells. A pixel cell may include an addressable sample-and-hold (S/H) circuit connected to a reset line of the addressable pixel cell. The S/H circuit may be configured to store a cell reset voltage related to the output of the pixel cell determined in previous read cycles. For instance, the cell reset voltage may be determined based on previous outputs of the pixel cell and/or neighboring pixel cells, an algorithm and/or user input at a user interface.

The cell reset voltage stored on the S/H circuit may alter the bias of the photodiode and thereby altering the capacitance of the photodiode. More specifically, if the S/H circuit stores a "low" voltage, this condition biases the photodiode to a higher capacitance and therefore more tolerant for higher currents and higher levels of illumination without saturation, i.e. bright conditions. Similarly, if the S/H circuit stores a "high" voltage, this condition biases the photodiode to a lower capacitance, and therefore more sensitive to lower current and lower levels of illumination, i.e., low light conditions.

Another embodiment generally relates to an array of high-dynamic range pixel cells. A sensor array may include a plurality of addressable pixel cells. The sensor array may also include an analog-to-digital converter ("ADC") processor, a digital processor, a memory, and a digital-to-analog converter ("DAC"). The output from the pixel cells may be connected to a video out line, which is connected as an input to the ADC processor. The ADC processor may be configured to generate a digital video out signal for subsequent processing. The ADC processor may also use the data stored in the memory to subtract the bias voltage from the video out signal before being processed by the ADC processor.

The digital video signal from the ADC processor may be directed to the digital processor where the digital video signal is processed. More particularly, the digital processor may be configured to determine whether to alter the reset voltages for the addressable pixel cells based on algorithms, user input and/or combinations thereof. For instance, the digital processor may determine, according to an algorithm and/or user input, that a 50×50 pixel region is "dark." The digital processor may adjust the bias voltage for these pixels and then store the adjusted bias voltage into memory locations associated with the pixels in the 50×50 pixel region. During an update, the DAC processor may be configured to address a selected addressable pixel and access the memory for the bias voltage information for the selected pixel. The DAC processor may output the analog voltage, which is then stored by the S/H circuit of the addressed pixel.

Reference will now be made in detail to embodiments of the present invention, examples of which are illustrated in the accompanying drawings. Wherever possible, the same reference numbers will be used throughout the drawings to refer to the same or like parts.

Figure 4:
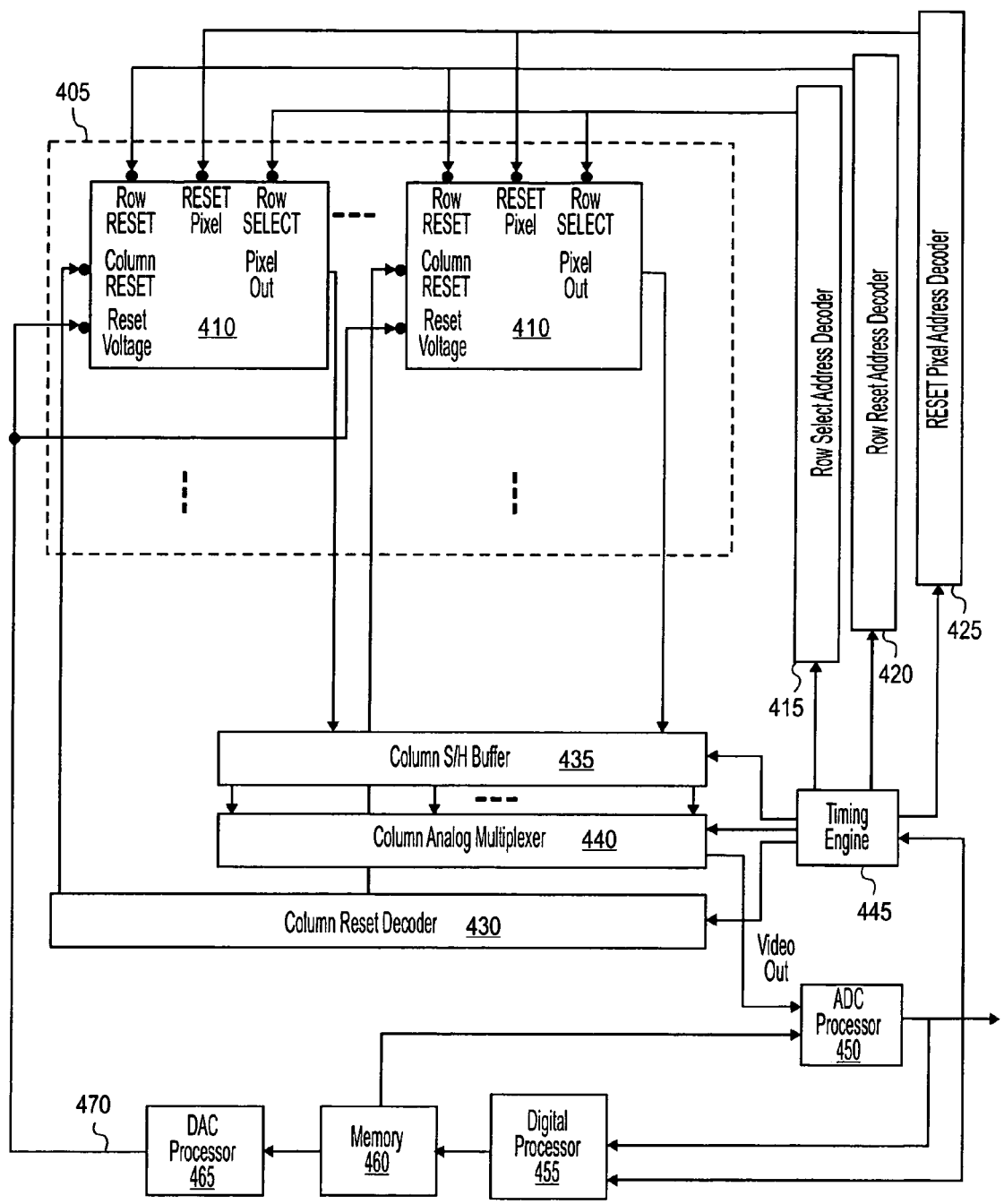
FIG. 4 illustrates an exemplary system in accordance with an embodiment of the invention.

FIG. 4 illustrates a block diagram of an exemplary high dynamic range sensor system 400 where an embodiment may be practiced. It should be readily apparent to those of ordinary skill in the art that the high dynamic range sensor system 400 depicted in FIG. 4 represents a generalized schematic illustration and that other components may be added or existing components may be removed or modified.

As shown in FIG. 4, the high dynamic range sensor system 400 may include a plurality of addressable pixel cells 410. The sensor array 405 of addressable pixel cells 410 may be electrically connected with a row select address decoder 415, a row reset address decoder 420, a RESET Pixel address decoder 425, a column reset decoder 430, and a column sample-and-hold (S/H) buffer 435. The high dynamic range sensor system 400 may also include a column analog multiplexer 440, a timing engine 445, an analog-to-digital converter ("ADC") processor 450, a digital processor 455, a memory 460, and a digital-to-analog converter ("DAC") converter 465.

Although FIG. 4 depicts the array 405 of addressable pixel cells 410 with two pixel cells, it should be understood that the two pixel cells are representative of an array of pixels cells. In a read cycle, the pixel cells 410 may be reset with a reset voltage by the RESET pixel address decoder 425. Subsequently, the pixels cells 410 may be addressed using the row select address decoder 415 which is configured to activate the row select line for a selected row. The pixel cells 410 in the selected row may be configured to output their respective pixel out voltages to the column S/H buffer 435. The column S/H buffer 435 may be configured to temporarily store the respective pixel out value of the selected row. The column analog multiplexer 440 may be configured to select a column position in the selected row and output the corresponding column position to the ADC processor 450 as the video out signal. The timing engine 445 may be further configured to serially output the column positions during a row read.

The ADC processor 450 may be configured to convert the received analog video out to a digital video out signal. The ADC processor 450 may be implemented using an analog-to-digital converter, a digital signal processor or other similar computing platform.

The ADC processor 450 may be further configured to adjust the output value of the addressed pixel cell by using the bias information of the pixel cell which it may retrieve from Memory 460. The adjustment may include the subtraction of the bias voltage information from the read pixel value. As the addressed pixel cells are being read, the digital processor 455 may be configured to access the memory 460 to store a reset voltage (or a future bias voltage) for the addressed pixel cell, where the reset voltage may be determined based on previous pixel output voltages, algorithms, user inputs, and/or combinations thereof.

In some embodiments, the digital processor 455 may implement an averaging algorithm to determine a bias voltage for a future pixel integration cycle. More particularly, for a 50×50 pixel region, the digital processor 455 may determine the average pixel out value in the region may be below or above a threshold. The digital processor 455 may then adjust the bias voltage for the pixel cells in the 50×50 pixel region. It should be obvious to one skilled in the art that other algorithms to determine adjustments are well within the scope of the claims.

In other embodiments, the digital processor 455 may adjust the bias voltages for a pixel region based on user input. For example, a security guard may highlight a dark area on a video monitor. The security guard may select (by touchscreen, mouse or combination thereof) an area on the video monitor. The digital processor 455 may then adjust the bias voltages in the selected area to increase detection in the selected area.

The digital processor 455 may be configured to interface with the timing engine 445 and to control the updating of a pixel cell bias voltage of a pixel cell. More specifically, during an update cycle, the digital processor 455 may signal the row reset decoder 420 to activate the row of the selected pixel and to signal the column reset decoder 430 to activate the column of the selected pixel. The digital processor 455 may also access the memory 460 to retrieve the reverse bias voltage information necessary to update the selected pixel cell. The bias voltage information may be processed by the DAC processor 465 to an analog reset voltage which is then outputted onto the reset voltage line 470. The analog reset voltage may then be stored in the sample-and-hold circuit of the selected pixel cell.

Figure 5:
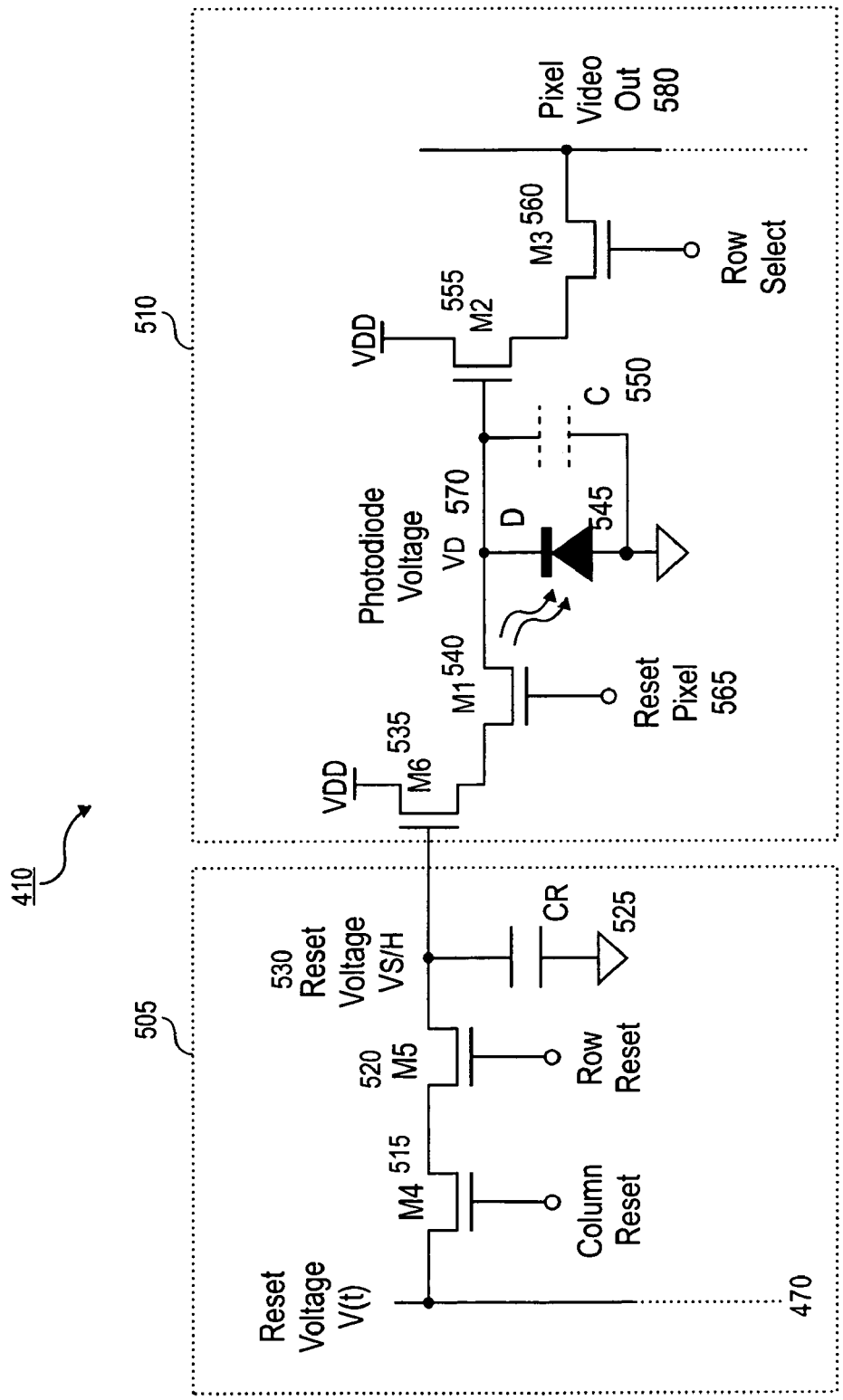
FIG. 5 illustrates another exemplary system in accordance with an embodiment of the invention.

FIG. 5 illustrates an exemplary addressable pixel cell 410 in accordance with another embodiment. It should be readily apparent to those of ordinary skill in the art that the addressable pixel cell 410 depicted in FIG. 5 represents a generalized schematic illustration and that other components may be added or existing components may be removed or modified.

As shown in FIG. 5, the addressable pixel cell 410 may include an addressable sample-and-hold (S/H) circuit 505 and a pixel cell 510. The addressable S/H circuit 505 may include an M4 transistor 515, an M5 transistor 520 and a capacitor $C_R$ 525. The source of the M4 transistor 515 may be connected to the reset voltage V(t) 470. The gate of the M4 transistor 515 may be connected to a line of the column reset decoder 430 (shown in FIG. 4). The drain of the M4 transistor 515 may be connected to the source of the M5 transistor 520. The gate of the M5 transistor 520 may be connected to a line of the row reset decoder 420 (shown in FIG. 4). The drain of the M5 transistor 520 may form a Reset Voltage $V_{S/H}$ node 530 with a gate of the M6 transistor 535. One end of capacitor $C_R$ 525 may be connected to this node while the other end of the capacitor $C_R$ 525 may be tied to ground or another reference voltage.

During an update cycle for a selected addressable pixel cell 410, the digital processor 455 may be configured to signal the row reset decoder 420 and the column reset decoder 430 to activate the row reset line and column reset line, respectively. Any voltage on the reset voltage V(t) 470 may then be stored on the capacitor $C_R$ 525 as the reset voltage $V_{S/H}$ 530.

The pixel cell 510 may include an M6 transistor 535, an M1 transistor 540, a photodiode 545, an equivalent C capacitor 550, am M2 transistor 555, and an M3 transistor 560. The gate of M6 transistor 535 may be tied to reset voltage $V_{S/H}$ 530 and the source of M6 transistor 545 may be tied to a voltage source $V_{DD}$. The drain of the M6 transistor 535 may be connected to the source of the M1 transistor 540.

The gate of the M1 transistor 540 may be connected to the reset pixel signal 565, which is under the control of the reset pixel decoder 425. The drain of the M1 transistor 540 may be connected to a photodiode voltage $V_D$ node 570. The cathode of the photodiode 545 may be connected to this node as well as the gate of the M2 transistor 555. The anode of the photodiode 545 may be connected to ground or to a reference voltage. The equivalent C capacitor 550 may include the capacitance of the photodiode 545 and may also include parasitic capacitances.

The source of the M2 transistor 555 may be tied to voltage source $V_{DD}$. The drain of the M2 transistor 555 may be connected to the source of the M3 transistor 560. The gate of the M3 transistor 560 may be connected with the row select signal under the control of the row select decoder 415 (shown in FIG. 4). The drain of the M3 transistor 560 may be connected with the pixel out video out line 580.

At the start of a new integration cycle, the reset pixel signal 565 may go high, which allows the bias voltage stored at the Reset Voltage $V_{S/H}$ node 530 and buffered by the voltage buffer M6 transistor 535 to charge the C capacitor 550 by turning on the M1 transistor 540. During an integration period, any light impinging on the photodiode 545 may leak away the electrical charge stored in the capacitor 550. When the row select signal is high on the gate of M3 transistor 560, the remaining voltage on the capacitor 550 may be buffered by the voltage buffer M2 transistor 555 and outputted on the pixel video out signal 580.

Figure 6:
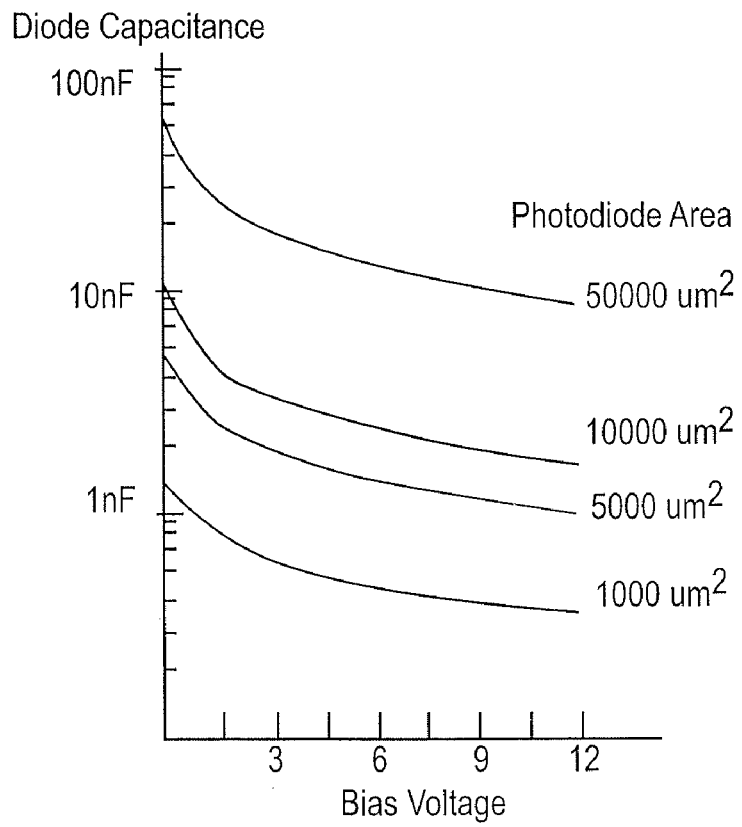
FIG. 6 depicts a graph of bias voltage versus diode capacitance.

As described previously, the capacitor $C_R$ 525 may store the bias voltage, which may be determined based on previous pixel out values, algorithms, user input and/or a combination thereof. The voltage on the capacitor $C_R$ 525 may affect the capacitance of the photodiode 545 in a relationship shown in FIG. 6. As a result, the capacitance of the photodiode 545 may vary according to the applied reverse bias voltage. For example, assuming that the photodiode 545 has an area of 5000 $\mu m^2$, the capacitance of photodiode 545 may be approximately 1.5 nF at 9 volts. If the reverse bias voltage is 3 volts, the capacitance of photodiode 545 may be 2 nF. As a general rule, higher the voltage, lower the capacitance may be used to describe the relationship between capacitance and reverse bias voltage.

As a result of this relationship between capacitance and reverse bias voltage, the effective dynamic range of the sensor array may be increased by using the previous pixel out values of the pixel cell to affect the capacitance of the photodiode and therefore the pixel integration time. The read rate from the sensor array 405 is sufficiently high so that the viewer is unaware of the aforementioned adjustments. Accordingly, for a "bright" area on the sensor array 405, the photodiodes in the bright area would eventually bias to a lower voltage caused by the bright area. Thus, the photodiodes in the bright area would have a higher capacitance and would adjust to a longer integration time to reach saturation, and thereby increasing the range in a bright area. Similarly, the photodiodes in a "dark" area would have a lower capacitance and would provide a measurable output after adjusting to a shorter integration time, and thereby increasing the range in a dark area.

Figure 7:
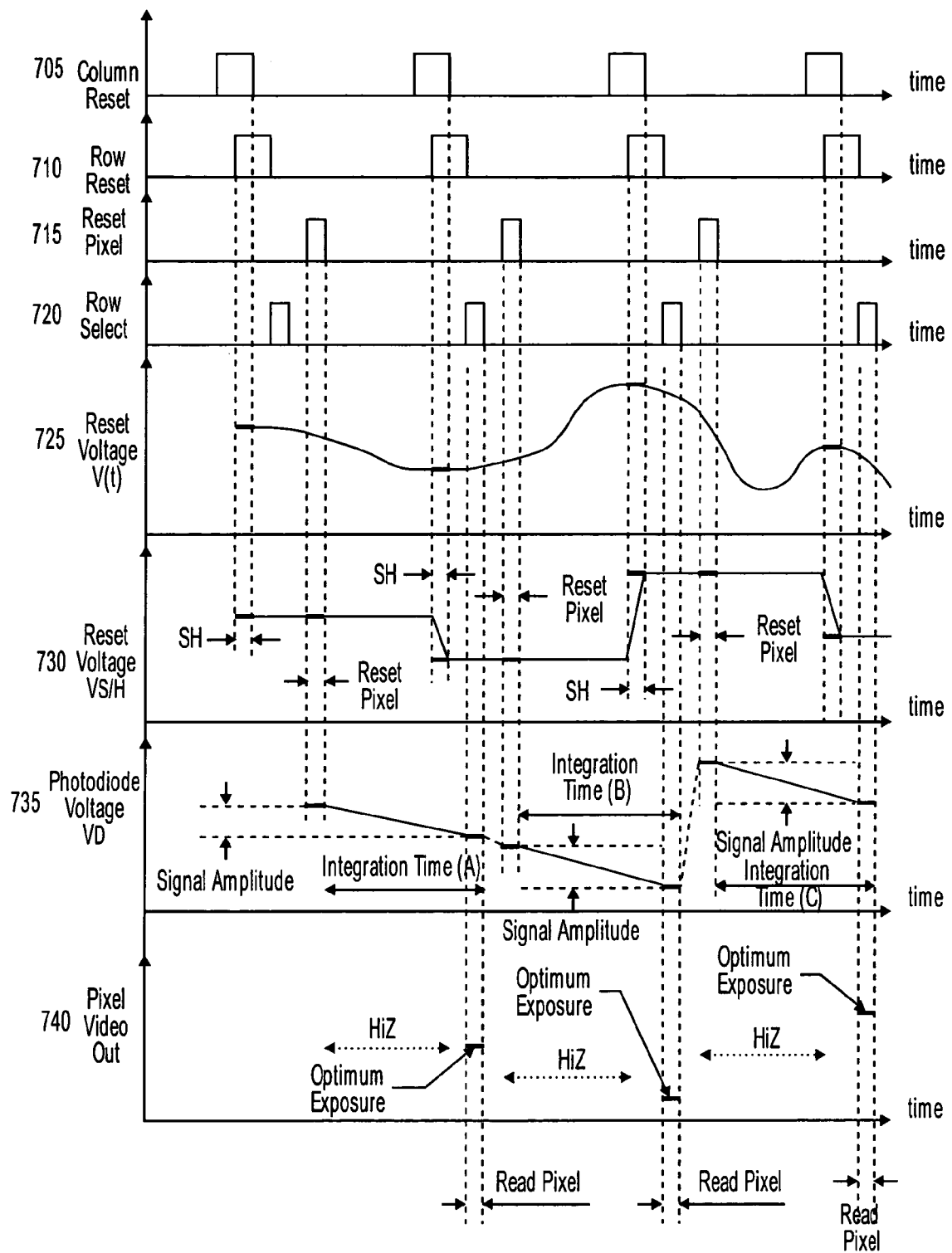
FIG. 7 illustrates a timing diagram in accordance with another embodiment.

FIG. 7 illustrates an integration diagram 700 in accordance with yet another embodiment. As shown in FIG. 7, the x-axis may be time and the y-axis may represent a variety of signals of the array 405: a column reset 705, a row reset 710, a reset pixel 715, a row select 720, a reset voltage V(t) 725, a reset voltage $V_{S/H}$ 730, a photodiode voltage $V_D$ 735 and a pixel video out 740.

When the column reset 705 and reset row reset 710 are both active, the M4 transistor 515 and M5 transistor 520 are turned on. As a result, the value of reset voltage V(t) 725 may be stored in the capacitor $C_R$ 525, i.e., reset voltage $V_{S/H}$ 730 may be set to the current value of reset voltage V(t) 725. When the reset pixel 715 is active, the value of the reset voltage $V_{S/H}$ 730 is then stored at capacitor 550. During the integration period, the photodiode D 545 may discharge the capacitor 550 proportional to the local intensity of light impinging the photodiode D 545. For example, in integration time (A), the video out signal is at the correct exposure because the video out signal does not become saturated. As depicted in FIG. 7, the video out voltage in integration time (B) is also not saturated.

For integration time (C), the pixel is adjusted to a "dark" local condition so the reset voltage is larger than the previous two integration times. As a result, the photodiode D 545 discharges from that higher voltage level which corresponds to a lower diode capacitance, and therefore a lower C capacitance 550. Accordingly, the discharge of C capacitance 550 generates higher amplitude for the video out signal.

In the above embodiments, the brightness of a pixel may be given by the output of the corresponding pixel cell and the bias value used for that measurement.

While the invention has been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method may be performed in a different order than illustrated or simultaneously. Those skilled in the art will recognize that these and other variations are possible within the spirit and scope as defined in the following claims and their equivalents.

What is claimed is:

1. A method of operating a pixel sensor array, the method comprising:
   determining a reverse bias voltage of a pixel cell photodiode based on at least one previous output value of at least one pixel cell in the array and on user input; and
   storing the reverse bias voltage in a sample-and-hold circuit.

2. The method of claim 1, further comprising:
   modifying a capacitance value of the pixel cell photodiode based on the reverse bias voltage.

3. The method of claim 1, further comprising:
   addressing at least one pixel cell in the sensor array to store the reverse bias voltage.

4. The method of claim 1, wherein a brightness of the pixel cell is given by the output value and the bias voltage.

5. A method of operating a pixel sensor array, the method comprising:
   determining a reverse bias voltage of a pixel cell photodiode based on one of at least one previous output value of a pixel cell in the array, of an algorithm and user-input;
   storing a value of the reverse bias voltage of the pixel cell photodiode in a memory based on an address of the pixel cell;
   addressing the pixel cell;
   retrieving the reverse bias voltage value from the memory;
   converting the reverse bias voltage into an analog output value; and
   outputting the analog output value to the pixel cell.

6. The method of claim 5, further comprising:
   receiving a user selected area from a user interface; and
   determining a new reverse bias voltage for pixel cells associated with the user selected area.

7. The method of claim 5, further comprising:
   modifying a capacitance value of the pixel cell photodiode based on the reverse bias voltage.

8. The method of claim 5, further comprising:
   addressing at least one pixel cell in the sensor array to store the reverse bias voltage.

9. The method of claim 5, wherein a brightness of the pixel cell is given by the output value and the bias voltage.

10. An apparatus for operating a high-dynamic range sensor array, the apparatus comprising:
    a sample-and-hold circuit configured to be addressable, the sample-and-hold circuit comprising a first transistor, a second transistor, and a capacitor; and
    a pixel cell configured to receive light and output a voltage based on the received light, wherein the sample-and-hold circuit is configured to reverse bias a photodiode in the pixel cell based on a previously determined and stored reverse bias voltage for the pixel cell.

11. A system for operating a high-dynamic range sensor array, comprising:
    a plurality of addressable pixel cells, each addressable pixel cell comprising:
    an addressable S/H circuit; and
    a pixel cell, wherein a pixel cell reset voltage is determined by an output voltage of the S/H circuit;
    a video out line connected to pixel out lines from the plurality of addressable pixel cells;
    an analog-to-digital (ADC) processor configured to receive the video out line, wherein the ADC processor converts signals on the video out line to digital signals;
    a processor configured to interface with the ADC processor, wherein the processor is configured to determine reset voltage values for the plurality of addressable pixel cells in the sensor array;
    a memory configured to store the reset voltage values for the addressable pixel cells in the sensor array; and
    a digital-to-analog (DAC) processor configured to interface with the memory and a reset voltage line, wherein the DAC processor is further configured to convert digital reset voltage values for the plurality of addressable pixel cells in the sensor array to analog reset voltage values and output the analog reset voltage values on the reset voltage line.

12. The system of claim 11, further comprising:
    a row reset address decoder configured to select a row of a selected addressable S/H circuit;
    a column reset address decoder configured to select a column of a selected addressable S/H circuit;
    a reset pixel address decoder configured to select a row of pixel cells to be reset;
    a row select address decoder configured to select a row of pixels to be read within the sensor array;
    a column S/H buffer configured to hold values of the pixel out lines of a selected row; and
    a column analog multiplexer configured to select a column of the S/H buffer.

13. The system of claim 12, wherein the processor is configured to activate row reset lines and column reset lines of the selected addressable S/H circuit, access the reset voltage value for a selected addressable pixel cell from the memory, and update the reset voltage of the selected addressable pixel cell.

14. The system of claim 13, wherein the selected addressable S/H circuit comprises a capacitor configured to store a reset voltage value in response to row lines and column lines being activated for the selected addressable S/H circuit.

15. The system of claim 14, wherein the stored reset voltage value on the capacitor is configured to reverse bias a photodiode in the pixel cell.

16. The system of claim 15, wherein a capacitance of the photodiode changes inversely with the reverse bias of the stored reset voltage value.

17. The system of claim 14, wherein the reset voltage stored value on the capacitor modifies a capacitance of a photodiode in the pixel cell.

18. The system of claim 12, wherein the processor is configured to activate row lines and column lines of a selected addressable pixel cell through the respective row select address decoder and column analog multiplexer to read a pixel out value of the selected addressable pixel cell.

19. The system of claim 18, wherein the processor is configured to store the reset voltage value in the memory based on an address of the selected addressable pixel cell.

* * * * *